United States Patent Office 3,386,534
Patented June 4, 1968

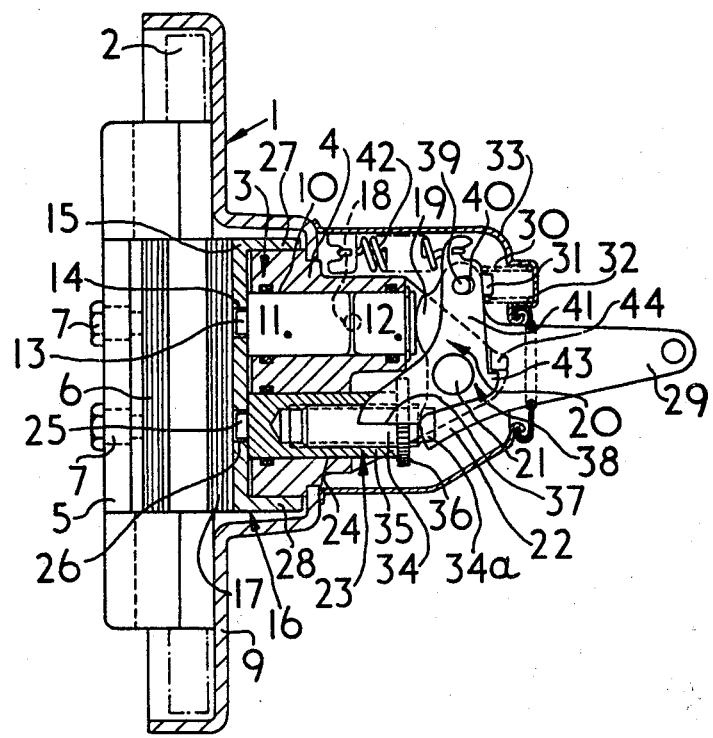

3,386,534
SPOT TYPE DISC BRAKES
Carl Press, Wunsiedel, Germany, assignor to The Dunlop Company Limited, Erdington, Birmingham, England, a corporation of Great Britain
Filed Apr. 18, 1967, Ser. No. 631,720
10 Claims. (Cl. 188—73)

ABSTRACT OF THE DISCLOSURE

A disc brake wherein an axially aligned hydraulic brake-applying mechanism acts directly on an associated friction element, the brake-applying mechanism being also associated with a lever mechanism mounted on the brake housing, whereby the reaction thrust from the brake-applying mechanism is applied to an axially movable thrust member spaced apart from the brake-applying mechanism and to a friction element associated with the thrust member.

This invention relates to spot-type disc brakes, and particularly to hydraulic and mechanical actuating mechanisms for brakes of this type.

In spot-type disc brakes the friction pads cover a relatively minor portion of the braking surfaces of the disc and in view of their small area they tend to wear relatively quickly. In order to increase the area of the friction surface of each pad, and thus reduce its wear rate, it is often desirable to employ friction pads of relatively larger area. In order to provide a uniform pressure over the whole area of the pad two or more separate side-by-side hydraulic actuating cylinders may need to be provided for each pad. This arrangement is relatively expensive compared with the cost of providing a single hydraulic cylinder for each pad, and also introduces difficulties in connection with the provision of a mechanical brake operating mechanism and an ajustment device.

It is also known to use actuating pistons of large diameter, but this involves dimensional difficulties because the swept volume of the cylinder increases proportionately to the square of the piston diameter and the existence of a large swept volume in the brake cylinder requires a correspondingly long stroke of the piston in the master cylinder to operate the brake.

Another arrangement which has been proposed is the use of actuating pistons of oval cross-section working in oval cylinders, but this raises difficulties in respect of the guiding and sealing of the piston in the cylinder and this arrangement has been found to be too expensive.

One object of the present invention is to provide a simple hydraulically or mechanically operated brake-appling mechanism for spot-type disc brakes which permits the use of brake pads having a large friction surface.

According to the invention a disc brake comprises a rotatable disc and a non-rotatable housing in which at least one friction element is supported for axial movement relative to the housing and to the disc, the housing having an axially aligned hydraulic brake-applying mechanism, a lever mechanism mounted on the housing and a thrust member axially movably supported on the housing and disposed in a position spaced from the hydraulic brake-applying mechanism, the hydraulic brake-applying mechanism being arranged to act directly on an associated friction element and to apply a reaction thrust through the lever mechanism and the thrust member to the said friction element at a position spaced from the hydraulic brake-applying mechanism.

According to the invention also, a disc brake comprises a rotatable disc and a non-rotatable housing which comprises a pair of limbs straddling a periphery of the disc, the housing being axially movable relative to the disc and having a friction element fixed to one limb thereof for engagement with one side of the disc, a movable friction element supported on the other limb of the housing for axial movement relative to the housing and to the disc, the said other limb comprising an axially aligned hydraulic brake-applying mechanism including a cylinder in which a first piston and a second piston are slidable, means for supplying hydraulic fluid to a space between the pistons, a lever mechanism mounted on the housing and a thrust member axially movably supported on the housing and disposed in a position spaced from the hydraulic brake-applying mechanism, the first piston being arranged to act directly on the movable friction element and the second piston being arranged to apply a reaction thrust through the lever mechanism and the thrust member to the said movable friction element at a position spaced from the hydraulic brake-applying mechanism.

Preferably the lever mechanism comprises a single lever pivoted between its ends on the brake housing and the thrust member comprises an automatic adjustment device operated by movement of the lever.

One embodiment of the invention will now be described with reference to the accompanying drawing, which is an axial cross-sectional view of a disc brake.

The disc brake 1 comprises a disc 2 and a brake housing 3 having a limb 4 on one side of the disc and a second limb 5 which extends over the edge of the disc to support a friction pad 6 fixed to the housing by bolts 7. The housing 3 is movable axially with respect to the disc and a guard plate 9 is fixed to the housing 3, serving to prevent the disc being splashed by water thrown up from the road.

The housing 3 contains a cylinder bore 10 which contains two actuating pistons 11 and 12. The first piston 11 carries a spigot 13 which engages in a socket 14 formed in the metal backing plate 15 of a movable friction element 16 comprising a friction pad 17. An inlet 18 for hydraulic fluid is provided to enable fluid under pressure to be supplied to the space between the pistons 11 and 12. The end of the piston 12 remote from the disc engages one end 19 of the actuating lever 20 pivoted on a pin 21 secured to the housing and arranged to engage, at its other end 22, a thrust member 23 which is slidable in a bore 24 of the housing and which has a spigot 25 engaging in a socket 26 formed in the backing plate 15. Thus the thrust generated in the space between the pistons 11 and 12 is transmitted directly to the friction element 16 through the piston 11 and a reaction thrust is transmitted through the piston 12, lever 20 and thrust member 23 to a spaced position on the backing plate.

To provide good guidance for the friction element 16 the backing plate 15 is formed with two axially extending arms 27 and 28 which engage a pair of flat parallel axially extending guide surfaces formed on the brake housing 3. The friction element 16 is located in the radial direction by the engagement of the spigots 13 and 25 with their corresponding sockets in the friction pad backing plate 15.

A mechanical brake operating mechanism is provided by the lever 20 which can be turned about its pivot by means of an arm 29 which is normally attached to a brake operating cable or rod. A return spring 30 in the form of a coiled compression spring is secured at one end to a projection 31 formed on the arm 19 of the lever 20 and rests at its other end in a socket 32 formed in a pressed metal cover portion 33 of the housing 3.

An adjustment device for both the hydraulic and the mechanical actuation mechanism of the brake includes an adjustment screw 34 which forms part of the thrust member 23 and is in screw-threaded engagement with a correspondingly screw-threaded bore in an adjustment sleeve 35 which forms a second part of the thrust member 23 and which has a head 36 formed with ratchet teeth engageable by one arm 37 of an adjustment lever 38 also pivoted on the pin 21 and thus rotatable about the same axis as that of the lever 20. The head 34a of the adjustment screw is formed with a slot in which the end 22 of the lever 20 engages, to prevent the adjustment screw from rotating. A peg 39 secured to the operating lever 20 projects through an elongated slot 40 formed in the other arm 41 of the adjustment lever 38, and a return spring 42 for the adjustment lever is secured at one end to the end of the arm 41 and at its other end to the housing.

The return spring 42 tends to urge the adjustment lever 38 in an anti-clockwise direction as seen in the drawing until an abutment 43 formed on the adjustment lever engages a mechanical stop 44 attached to the brake housing.

The action of the adjustment device is as follows. When the brake is applied either by the mechanical or by the hydraulic brake applying mechanism, the lever 20 is rotated in the clockwise direction as seen in the drawing. Provided that the friction pad wear which has taken place is less than a predetermined amount, the peg 39 is not moved sufficiently to contact the end of its slot 40 in the adjustment lever 38, and the adjustment lever does not turn about its pivot 21. When the brake is released the lever 20 returns to the position shown in the drawing with the peg 39 in the position as shown. If, however, sufficient wear of the friction pads occurs the lever 20 will have to move through an angle which is sufficiently great to cause the peg 39 to engage the other end of the slot 40 and to rotate the adjustment lever 38 in the clockwise direction as shown in the drawing, and when this movement exceeds a predetermined amount it will cause the arm 37 of the adjustment lever to ride over one of the teeth of the ratchet 36. On release of the brake the adjustment lever 38 will be rotated by the return spring 42 in the anti-clockwise direction as seen in the drawing, and will thus turn the adjustment sleeve 35 through an appropriate angle to increase the length of the thrust member so as to take up the wear which has occurred. The adjustment sleeve 35 cannot rotate while the brake is being applied, since the frictional forces created by the brake applying thrust, half of which acts through the thrust member, are too great to permit rotation of the sleeve by the arm 37.

The brake described above has the advantage that it includes a compact and constructionally simple hydraulic and mechanical actuating system which is particularly suitable for application to spot-type brakes having friction pads of large areas. The dimensions of the actuating mechanism do not need to be any greater, considered in a plane parallel to that of the brake disc, than those of the friction elements themselves. A further advantage is that the hydraulic actuating mechanism only requires the addition of an operating arm to provide a mechanical actuating mechanism.

Having now described my invention, what I claim is:

1. A disc brake comprising a rotatable disc and a non-rotatable housing in which at least one friction element is supported for axial movement relative to the housing and to the disc, the housing having an axially aligned hydraulic brake-applying mechanism, a lever mechanism mounted on the housing and a thrust member axially movably supported on the housing and disposed in a position spaced from the hydraulic brake-applying mechanism, the hydraulic brake-applying mechanism being arranged to act directly on an associated friction element and to apply a reaction thrust through the lever mechanism and the thrust member to the said friction element at a position spaced from the hydraulic brake-applying mechanism.

2. A disc brake comprising a rotatable disc and a non-rotatable housing which comprises a pair of limbs straddling a periphery of the disc, the housing being axially movable relative to the disc and having a friction element fixed to one limb thereof for engagement with one side of the disc, a movable friction element supported on the disc, a movable friction element supported on the other limb of the housing for axial movement relative to the housing and to the disc, the said other limb comprising an axially aligned hydraulic brake-applying mechanism including a cylinder in which a first piston and a second piston are slidable, means for supplying hydraulic fluid to a space between the pistons, a lever mechanism mounted on the housing and a thrust member axially movably supported on the housing and disposed in a position spaced from the hydraulic brake-applying mechanism, the first piston being arranged to act directly on the movable friction element and the second piston being arranged to apply a reaction thrust through the lever mechanism and the thrust member to the said movable friction element at a position spaced from the hydraulic brake-applying mechanism.

3. A disc brake according to claim 2 wherein the lever mechanism comprises an actuating lever pivoted between its ends on the housing and engaging the second piston at one end and the thrust member at its other end.

4. A disc brake according to claim 3 wherein the lever is provided with an arm by which the lever can be turned to apply pressure to the thrust member and thus to provide a mechanical brake operating mechanism.

5. A disc brake according to claim 3 wherein the thrust member comprises two parts in screw-threaded engagement with one another, adjustment means being provided for turning one part of the thrust member relatively to the other part to effect automatic adjustment of the brake.

6. A disc brake according to claim 5 wherein the thrust member comprises an adjustment screw having a head engageable with the actuating lever and prevented from rotating by its engagement with the actuating lever, and an adjustment sleeve having a screw-threaded bore in screw-threaded-engagement with the adjustment screw and having a ratchet formed thereon for engagement with the said adjustment means, the adjustment sleeve being axially slidable in a bore of the housing and being engageable with the movable friction element.

7. A disc brake according to claim 5 wherein an adjustment lever is arranged to be turned by the actuating lever and an adjustment lever return spring is provided to oppose the movement of the adjustment lever, one part of the thrust member being provided with a ratchet having teeth engageable by the adjustment lever and arranged so that the adjustment lever can turn the ratchet on release of the brake when wear of the friction elements has occurred.

8. A disc brake according to claim 7 wherein the adjustment lever is pivotally mounted about the same axis as the actuating lever and comprises a pair of arms, one arm engaging the ratchet and the other arm being connected to the adjustment lever return spring and having a slot therein for engagement with a peg attached to the actuating lever, the adjustment lever having an abutment formed thereon for engagement with a mechanical stop attached to the brake housing in the released state of the brake.

9. A disc brake according to claim 2 wherein the housing comprises a cover portion having a socket in which a coiled compression spring is located so as to provide a return spring for the actuating lever.

10. A disc brake according to claim 2 wherein the movable friction element comprises a backing plate having a pair of axially extending arms one at each end which are engageable with corresponding axially extending guide surfaces formed on the brake housing.

References Cited

UNITED STATES PATENTS

| 3,185,263 | 5/1965 | Schanz et al. | 188—73 X |
| 3,213,969 | 10/1965 | Rosanowski et al. | 188—73 |
| 3,236,336 | 2/1966 | Harrison. | |

FERGUS S. MIDDLETON, *Primary Examiner.*

G. E. HALVOSA, *Assistant Examiner.*

UNITED STATES PATENT OFFICE
CERTIFICATE OF CORRECTION

Patent No. 3,386,534              June 4, 1968

Carl Press

It is certified that error appears in the above identified patent and that said Letters Patent are hereby corrected as shown below:

Column 1, line 54, "appling" should read -- applying --. Column 2, line 49, "the" should read -- an --. Column 4, lines 16 and 17, cancel "a movable friction element supported on the disc".

Signed and sealed this 27th day of January 1970.

(SEAL)
Attest:

Edward M. Fletcher, Jr.
Attesting Officer

WILLIAM E. SCHUYLER, JR.
Commissioner of Patents